US012433848B2

United States Patent
Leng et al.

(10) Patent No.: US 12,433,848 B2
(45) Date of Patent: Oct. 7, 2025

(54) ULTRASOUND RESPONSIVE LIPID NANOPARTICLE CARRYING GENES AND CELL MEMBRANE, ITS PREPARATION METHOD AND APPLICATION

(71) Applicant: Harbin Medical University, Harbin (CN)

(72) Inventors: Xiaoping Leng, Harbin (CN); Zhuo Wang, Harbin (CN); Ping Sun, Harbin (CN); Jiaxu Wang, Harbin (CN); Chen Zhao, Harbin (CN); Shouqiang Li, Harbin (CN)

(73) Assignee: Harbin Medical University, Harbin (CN)

( * ) Notice: Subject to any disclaimer, the term of this patent is extended or adjusted under 35 U.S.C. 154(b) by 0 days.

(21) Appl. No.: 18/871,826

(22) PCT Filed: Apr. 24, 2024

(86) PCT No.: PCT/CN2024/089608
§ 371 (c)(1),
(2) Date: Dec. 5, 2024

(87) PCT Pub. No.: WO2025/050661
PCT Pub. Date: Mar. 13, 2025

(65) Prior Publication Data
US 2025/0170071 A1    May 29, 2025

(30) Foreign Application Priority Data
Sep. 6, 2023   (CN) .......................... 202311144524.3

(51) Int. Cl.
*A61K 9/51*    (2006.01)
*A61K 9/00*    (2006.01)
(Continued)

(52) U.S. Cl.
CPC .......... *A61K 9/5176* (2013.01); *A61K 9/0009* (2013.01); *A61K 9/5123* (2013.01);
(Continued)

(58) Field of Classification Search
None
See application file for complete search history.

(56) References Cited

U.S. PATENT DOCUMENTS

2022/0380748 A1* 12/2022 Kumar ................. G01N 1/4077

FOREIGN PATENT DOCUMENTS

| CN | 111254162 A | 6/2020 |
|---|---|---|
| CN | 112402379 A | 2/2021 |

(Continued)

OTHER PUBLICATIONS

Yoko Endo-Takahashi, et al., Nucleic Acid Delivery System by the Combination of Lipid bubbles and Ultrasound, Current Pharmaceutical Design, 2018, pp. 2673-2677, vol. 24, No. 23.

*Primary Examiner* — Jeffrey D Washville
(74) *Attorney, Agent, or Firm* — Bayramoglu Law Offices LLC (57) ABSTRACT

An ultrasound responsive lipid nanoparticle carrying genes and a cell membrane is provided, which can simultaneously carry small molecule nucleic acids and a cell membrane, and can be used as a gene transfection carrier in vivo. Its surface is connected with small molecule nucleic acids based on the principle of charge adsorption, a component of a cell membrane is mixed in a surface lipid layer, PFP is encapsulated inside the nanoparticle, liquid gas phase transition occurs under ultrasonic irradiation, and blasting occurs under continuous ultrasonic irradiation, the blasting energy generated forms reversible acoustic holes on the surface of the cell membrane, and a drug released after blasting is driven by a blasting driving force to directly enter an interior of the cell (Continued)

through the acoustic holes, realizing an efficient release and transfection of nucleic acids in the cell.

3 Claims, 5 Drawing Sheets

(51) Int. Cl.
*A61K 31/7105* (2006.01)
*C12N 15/113* (2010.01)
(52) U.S. Cl.
CPC ...... *A61K 31/7105* (2013.01); *C12N 15/1136* (2013.01); *C12N 2310/14* (2013.01); *C12N 2310/141* (2013.01)

(56) References Cited

FOREIGN PATENT DOCUMENTS

| | | | |
|---|---|---|---|
| CN | 115429760 | A | 12/2022 |
| CN | 117298067 | A | 12/2023 |
| WO | 0124705 | A1 | 4/2001 |

* cited by examiner

ULTRASOUND RESPONSIVE LIPID NANOPARTICLE CARRYING GENES AND CELL MEMBRANE, ITS PREPARATION METHOD AND APPLICATION

CROSS REFERENCE TO THE RELATED APPLICATIONS

This application is the national phase entry of International Application No. PCT/CN2024/089608, filed on Apr. 24, 2024, which is based upon and claims priority to Chinese Patent Application No. 202311144524.3, filed on Sep. 6, 2023, the entire contents of which are incorporated herein by reference.

TECHNICAL FIELD

The invention relates to the technical field of pharmaceutical preparations, particularly to an ultrasound responsive lipid nanoparticle carrying genes and a cell membrane, its preparation method and application.

BACKGROUND

A small molecule nucleic acid drug is generally composed of less than 30 basic group or base pairs, and mainly uses mRNA as a target to regulate an expression of a protein, including siRNA, aptamer, miRNA, etc. It has advantages of short research and development cycle before a clinical treatment, high specificity and efficiency, and can achieve a precise treatment of a disease on a gene level. However, because the small molecule nucleic acid drug is unstable in the circulation in vivo and easy to be degraded, to achieve a precise transfection in vivo, a targeted carrier needs to be designed and constructed. At present, commonly used carriers mainly include a viral carrier and a non-viral carrier. The viral carrier has high transfection efficiency but poor application safety, and does not have targeting, so a clinical transformation is limited. A Non-viral carrier includes a cationic liposome, a polyethylenimine and other cationic complexes, which adsorbs nucleic acids on a surface of a carrier to form a stable carrier mainly based on a principle of charge adsorption. However, these types of nano carriers generally lack a specific targeting function of a specific regulatory cell in a disease area, and after phagocytosis with a cell they cannot avoid engulfing and digesting by a lysosome, resulting in low transfection efficiency. To achieve precise treatment to a disease based on small molecule nucleic acid drug, the nano carrier needs not only an ability to break through a biological barrier in vivo and reach the disease area, but also an ability to release safe and efficient intracellular nucleic acids.

Ultrasound-targeted microbubble destruction, UTMD is a rapidly developing mediated gene transfection method in recent years. When a microbubble or an ultrasound phase change nanoparticle is used as a carrier, a gas nucleus formed inside the carrier can explode under a pressure change generated by an acoustic field and release energy outward, instantly forming reversible pores on a cell membrane surface, forming an "acoustic pore effect". Nucleic acids carried inside or on the surface can directly enter the cell through the acoustic pores under a driving force generated by an explosion. At the same time, this method uses a focused ultrasound irradiation. Due to a directional nature of ultrasound, it can achieve a targeted irradiation in a specific tissue area, forming a targeted acoustic field in the disease area. Combined with a specific targeting ability of the microbubble, precise intracellular gene transfection can be achieved, which has better safety compared to an electroporation.

At present, a microbubble or an ultrasound phase change nanoparticle is still mainly used to carry a small molecule nucleic acid drug based on the principle of charge adsorption. A cationic gene carrier is easy to adsorb proteins in the blood. Blood compatibility needs to be improved, and it is easy to be captured and cleared by immune cells, which makes the number of the carriers getting to a target cell less. Biomimetic nanotechnology is another breakthrough in a nano drug delivery technology in recent years. A biomimetic nanoparticle is a nanoparticle that coats a gene or drug through a cell membrane, which can change characteristics of a nano biological interface through its surface cell membrane coating, imitate biological behavior that an endogenous mediated by the cell membrane, and achieve a different diagnosis and treatment purpose. Meanwhile, an endogenous cell membrane can cover the surface of the nanoparticle, swallow and immune system recognition site, and significantly prolong the blood circulation time of nanoparticles.

However, there is no report of a gene carrier using the biomimetic nanotechnology combined with UTMD technology. The main reason is that the nucleic acid as a water-soluble material cannot be dissolved in liquid fluorocarbon encapsulated inside the nanoparticle or gas encapsulated inside the microbubble. Therefore, the cationic lipid nanoparticles need to be prepared to adsorb microRNA on the surface of the nanoparticles based on the charge adsorption principle. The technology of biomimetic nanoparticle preparation is to coat the cell membrane on the surface of the nanoparticles, requiring that the core surface potential of the nanoparticles is negative in the preparation process. If the cationic nanoparticle is used as a core to prepare the biomimetic nanoparticle, in the process of mixing with the cell membrane, the nanoparticle and the cell membrane will cross link each other due to charge adsorption and form a complex with a complicated structure, which cannot be a biomimetic nanoparticle with a stable core-shell structure and a uniform shell thickness. Therefore, it is necessary to adopt a new strategy to improve a preparation method and function of a small molecule nucleic acid drug carrier.

SUMMARY

In order to overcome the defects of the prior art, the technical problem to be solved by the invention is to provide an ultrasound responsive lipid nanoparticle carrying genes and a cell membrane, which can simultaneously carry small molecule nucleic acids and a cell membrane, and can be used as a gene transfection carrier in vivo.

The technical scheme of the invention is as follows.

Its surface is connected with small molecule nucleic acids based on the principle of charge adsorption, a component of a cell membrane is mixed in a surface lipid layer, PFP is encapsulated inside the nanoparticle, liquid gas phase transition occurs under ultrasonic irradiation, and blasting occurs under continuous ultrasonic irradiation, the blasting energy generated forms reversible acoustic holes on the surface of the cell membrane, and a drug released after blasting is driven by a blasting driving force to directly enter an interior of the cell through the acoustic holes, realizing an efficient release and transfection of nucleic acids in the cell.

A preparation method for the ultrasound responsive lipid nanoparticle carrying genes and a cell membrane is also provided, including:

(1) preparing the cationic ultrasonic phase change nanoparticle: mixing DSPC, DSPE and DOTAP, and dissolving in dichloromethane, placing in a rotary evaporator to obtain a layer of uniform translucent film, adding ultrapure water, placing in an ultrasonic cleaner to completely elute the film to form a homogeneous and translucent suspension, transferring the suspension to a centrifuge tube, precooling on ice, adding an ultrasonic phase change material, changing the translucent suspension obtained into an opaque lotion after ultrasonic vibration to obtain an initial lotion with the nanoparticles, centrifuging at a low temperature and high speed for many times to remove excess impurities, to obtain the cationic ultrasonic phase change nanoparticles purified;

(2) preparing the ultrasonic phase change nanoparticle carrying the small molecule nucleic acid drug: mixing the cationic ultrasonic phase change nanoparticles prepared in step (1) with small molecule nucleic acids and incubating on ice, connecting the small molecule nucleic acids to the surface of lipid nanoparticles based on a principle of charge adsorption, and forming charge reversal on the surface of lipid nanoparticles to prepare the ultrasonic phase change nanoparticle carrying the small molecule nucleic acid drug;

(3) preparing the biomimetic ultrasound phase change nanoparticle carrying the small molecule nucleic acid drug: mixing the cell membrane with the ultrasonic phase change nanoparticle carrying the small molecule nucleic acid drug obtained in step (2), adding the cell membrane component to the lipid shell component of the nanoparticle based on a fluidity of a lipid membrane by an acoustic vibration method, placing the mixture in an ice bath, adding PFP to it again, obtaining the biomimetic ultrasound phase change nanoparticle carrying the small molecule nucleic acid drug after ultrasonic vibration, and centrifugating at a low temperature and high speed for many times to remove excess impurities, to obtain the biomimetic ultrasound phase change nanoparticle carrying the small molecule nucleic acid drug purified.

In the invention the cationic liposome is as a core, surface charges of nanoparticles are reversed based on the principle of charge adsorption, because of the fluidity of a cell membrane lipid layer, nanoparticles are broken and recombined through ultrasonic vibration, the cell membrane is integrated on the surface of nanoparticles carrying genes, and finally the biomimetic ultrasound phase change nanoparticles carrying the biomimetic ultrasound phase change nanoparticle carrying the small molecule nucleic acid drug are prepared, which can simultaneously carry small molecule nucleic acids and cell membranes, and can be used as gene transfection vectors in vivo.

Its application is also provided which is applied in a targeted therapy for acute myocardial infarction, acute rejection after heart transplantation, lung metastasis of breast cancer and liver metastasis of colon cancer.

DETAILED DESCRIPTION OF THE EMBODIMENTS

The surface of the ultrasound responsive lipid nanoparticle carrying genes and a cell membrane is connected with small molecule nucleic acids based on the principle of charge adsorption, a component of a cell membrane is mixed in a surface lipid layer, PFP is encapsulated inside the nanoparticle, liquid gas phase transition occurs under ultrasonic irradiation, and blasting occurs under continuous ultrasonic irradiation, the blasting energy generated forms reversible acoustic holes on the surface of the cell membrane, and a drug released after blasting is driven by a blasting driving force to directly enter an interior of the cell through the acoustic holes, realizing an efficient release and transfection of nucleic acids in the cell.

In the invention the cationic liposome is as a core, surface charges of nanoparticles are reversed based on the principle of charge adsorption, because of the fluidity of a cell membrane lipid layer, nanoparticles are broken and recombined through ultrasonic vibration, the cell membrane is integrated on the surface of nanoparticles carrying genes, and finally the biomimetic ultrasound phase change nanoparticles carrying the biomimetic ultrasound phase change nanoparticle carrying the small molecule nucleic acid drug are prepared, which can simultaneously carry small molecule nucleic acids and cell membranes, and can be used as gene transfection vectors in vivo.

Preferably, the component of the lipid nanoparticle includes distearoyl phosphatidylcholine referred to as DSPC, distearoyl phosphatidylethanolamine referred to as DSPE, and 1,2-Dioleoyl-3-Trimethylammonium-Propane referred to as DOTAP, in which DOTAP carries a cationic component, the cell membrane is an erythrocyte membrane, a macrophage membrane, a stem cell membrane, a neutrophil membrane or a tumor cell membrane, the small molecule nucleic acid drug is siRNA, antisense oligonucleotides (ASO), Aptamer, miRNA or saRNA.

Figure 1A:
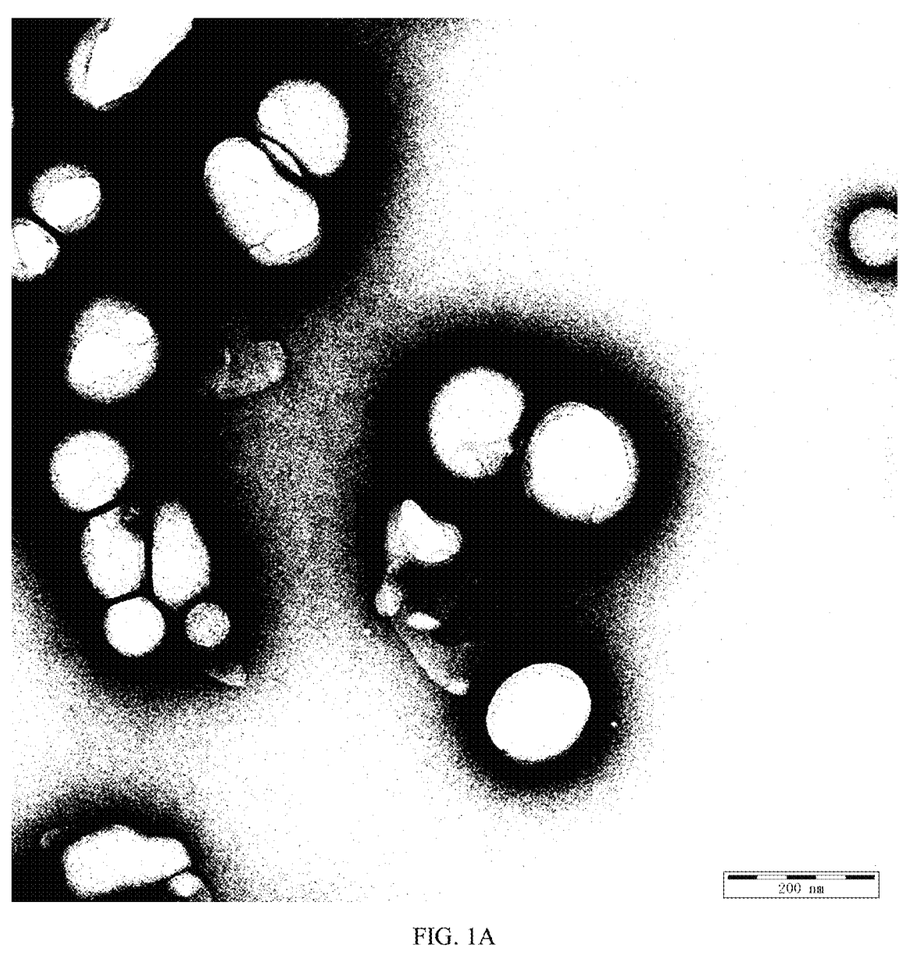
FIGS. 1A-1B show the structure photo (FIG. 1A) and particle size potential detection results (FIG. 1B) of miR-125b carrying biomimetic ultrasonic phase change nanoparticles obtained in embodiment 3 of the present invention under the transmission electron microscope.
Figure 1B:
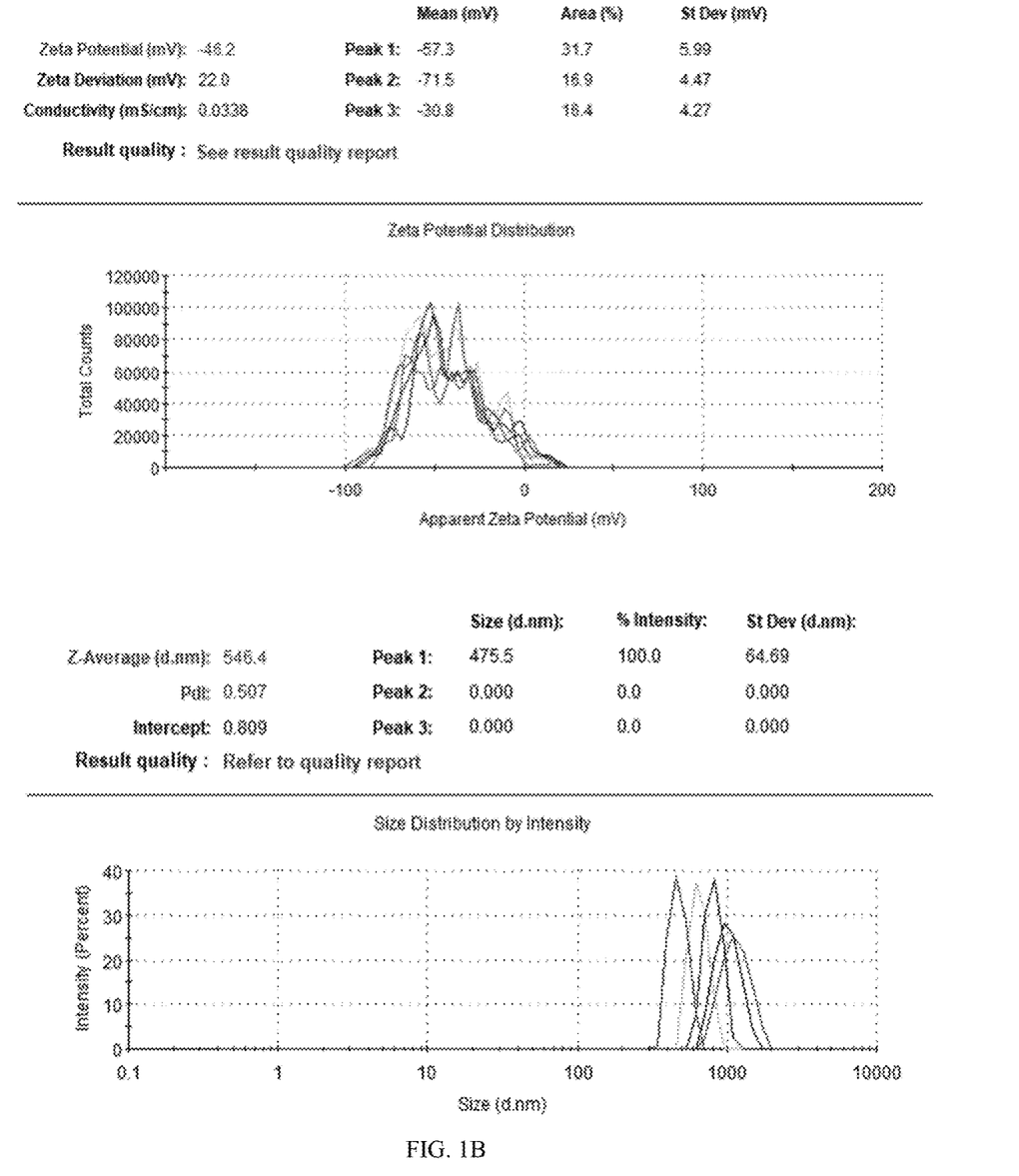
Figure 2:
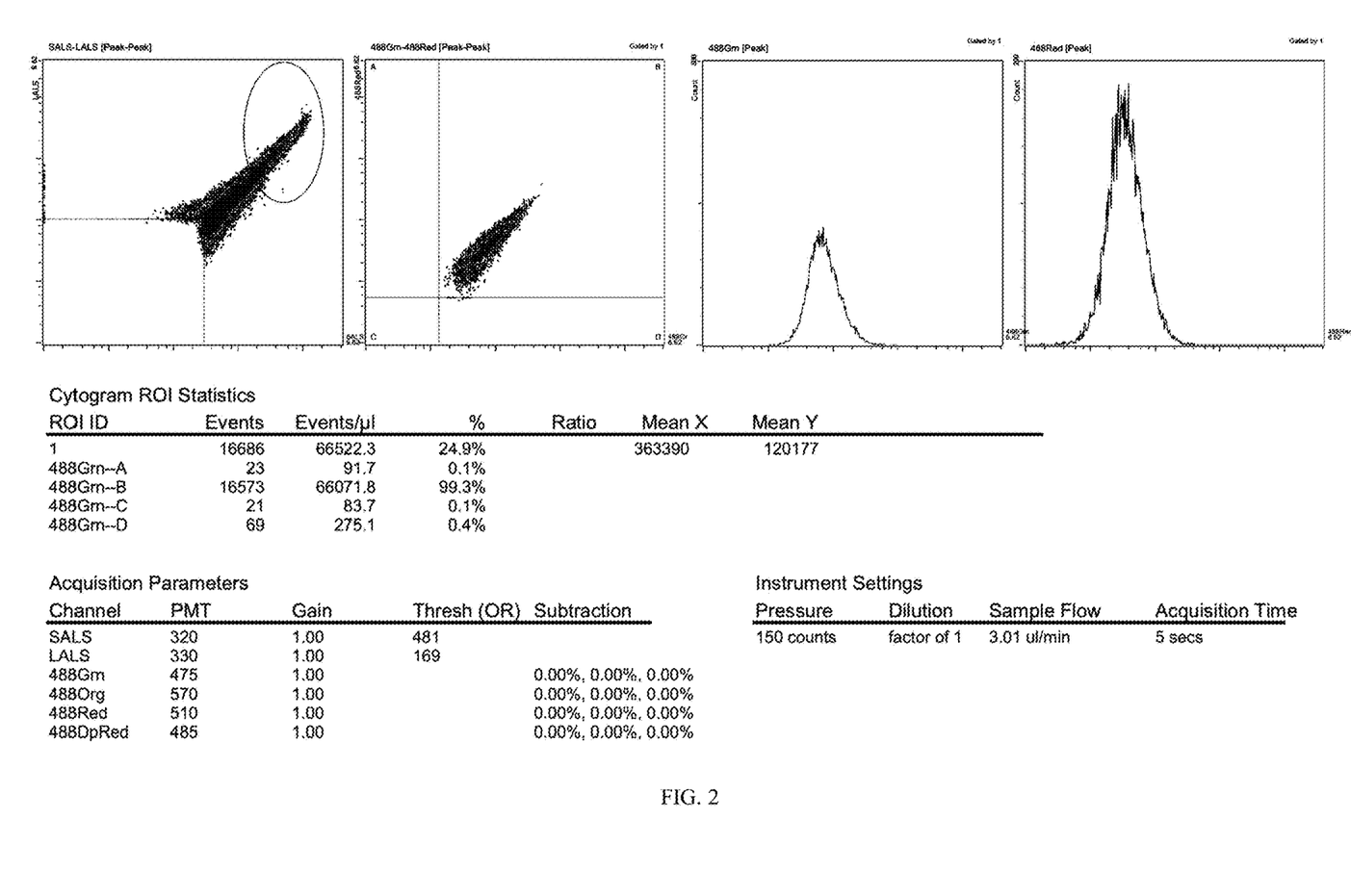
FIG. 2 shows the detection results of miR-125b and cell membrane carrying efficiency of the biomimetic ultrasonic phase change nanoparticles carrying miR-125b obtained in embodiment 3 of the present invention using flow cytometry.
Figure 3A:
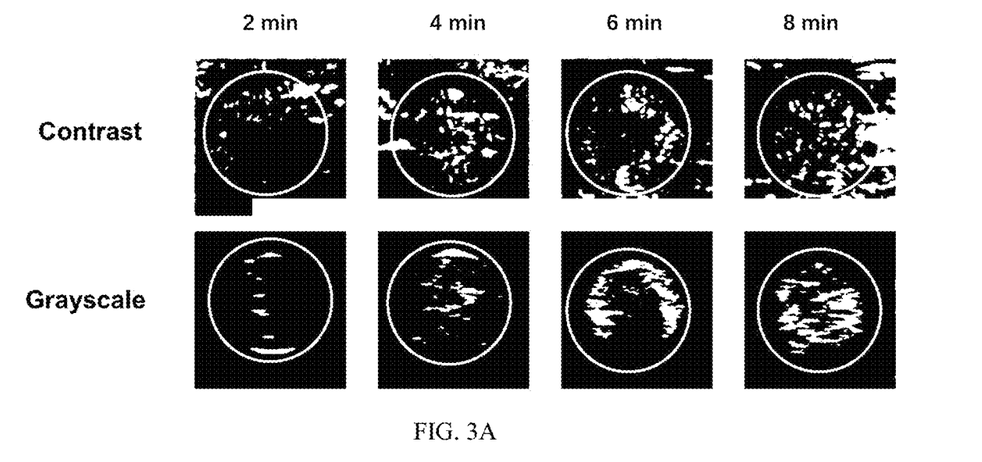
FIGS. 3A-3C show the detection results of the phase change ability of the nanoparticles carrying miR-125b biomimetic ultrasonic phase change nanoparticles under different LIFU irradiation time obtained in embodiment 3 of the present invention.
Figure 3B:
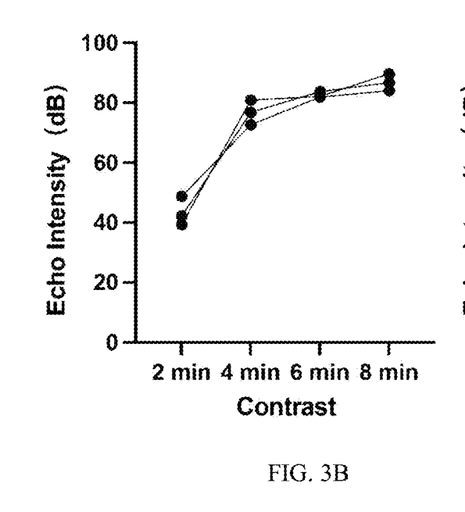
Figure 3C:
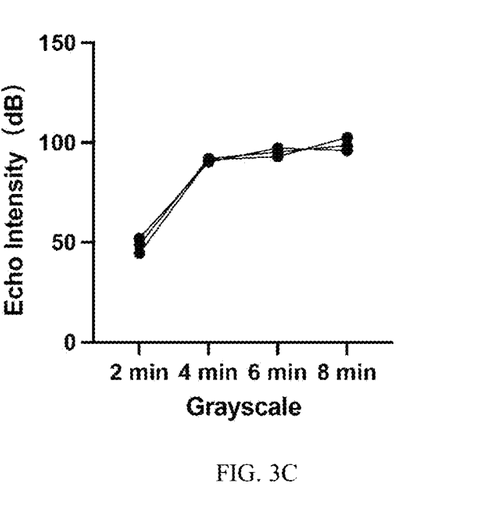
Figure 4:
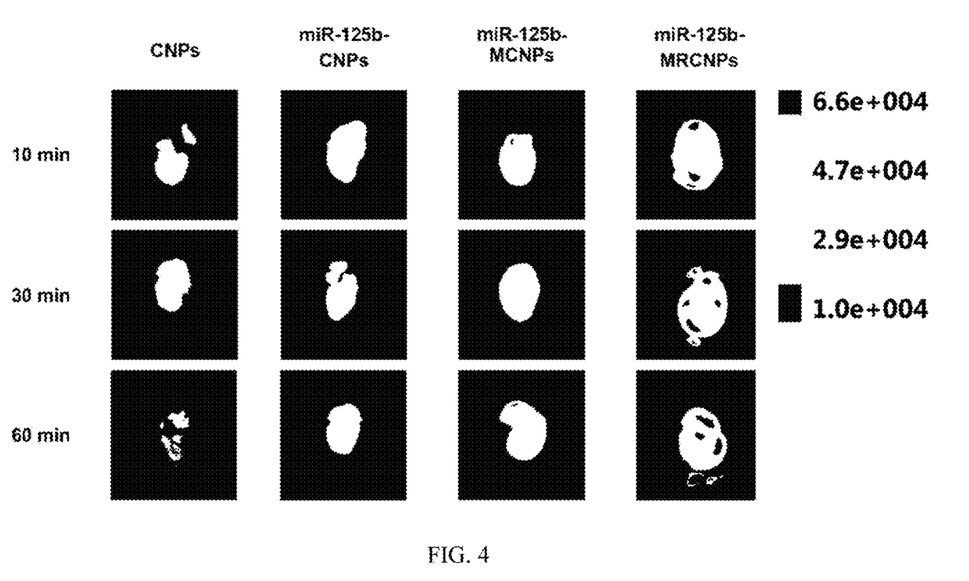
FIG. 4 shows the detection of targeting ability of biomimetic ultrasound phase change nanoparticles carrying miR-125b in the peri infarcted myocardial region in vivo obtained in embodiment 3 of the present invention.
Figure 5:
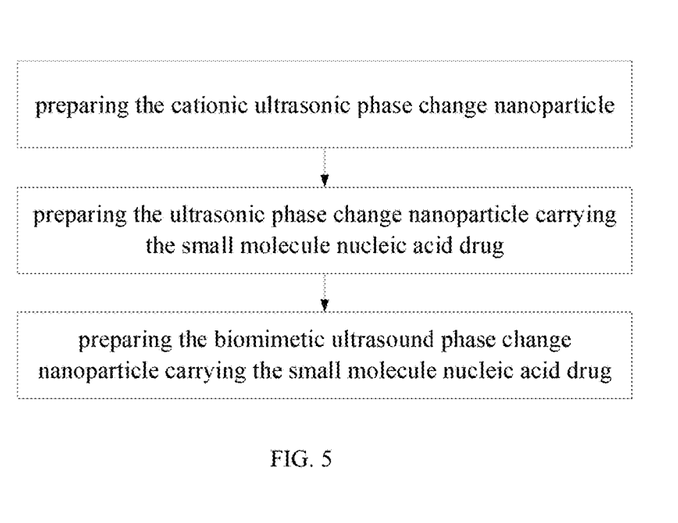
FIG. 5 is a flowchart of the preparation method for the ultrasound responsive lipid nanoparticle carrying genes and a cell membrane according to the invention.

As shown as FIG. 5, a preparation method for the ultrasound responsive lipid nanoparticle carrying genes and a cell membrane is also provided, including:

(1) preparing the cationic ultrasonic phase change nanoparticle: mixing DSPC, DSPE and DOTAP, and dissolving in dichloromethane, placing in a rotary evaporator to obtain a layer of uniform translucent film, adding ultrapure water, placing in an ultrasonic cleaner to completely elute the film to form a homogeneous and translucent suspension, transferring the suspension to a centrifuge tube, precooling on ice, adding an ultrasonic phase change material, changing the translucent suspension obtained into an opaque lotion after ultrasonic vibration to obtain an initial lotion with the nanoparticles, centrifugating at a low temperature and high speed for many times to remove excess impurities, to obtain the cationic ultrasonic phase change nanoparticles purified;

(2) preparing the ultrasonic phase change nanoparticle carrying the small molecule nucleic acid drug: mixing the cationic ultrasonic phase change nanoparticles prepared in step (1) with small molecule nucleic acids and incubating on ice, connecting the small molecule nucleic acids to the surface of lipid nanoparticles based on a principle of charge adsorption, and forming charge reversal on the surface of lipid nanoparticles to prepare the ultrasonic phase change nanoparticle carrying the small molecule nucleic acid drug;

(3) preparing the biomimetic ultrasound phase change nanoparticle carrying the small molecule nucleic acid drug: mixing the cell membrane with the ultrasonic phase change nanoparticle carrying the small molecule nucleic acid drug obtained in step (2), adding the cell membrane component to the lipid shell component of the nanoparticle based on a fluidity of a lipid membrane by an acoustic vibration method, placing the mixture in an ice bath, adding PFP to it again, obtaining the biomimetic ultrasound phase change nanoparticle carrying the small molecule nucleic acid drug after ultrasonic vibration, and centrifugating at a low temperature and high speed for many times to remove excess impurities, to obtain the biomimetic ultrasound phase change nanoparticle carrying the small molecule nucleic acid drug purified.

Preferably, in step (1), the mass ratio of DSPC, DSPE and DOTAP is 10:4:2.

Preferably, in step (1), the ultrasonic vibration uses an acoustic cell disruptor with the condition set to 90 W, a total time of 5 min, and a duty cycle of 50%; the condition of the rotary evaporator is set at 60° C. for 1 H; the purification is repeated by a low-temperature high-speed centrifuge, and the centrifugation condition is set at 12000 rpm for 15 min each time, a total of three times.

Preferably, in step (1), the phase change material is liquid perfluoropentane referred to as PFP, chemical formula $C_5F_{12}$, molecular weight 288.036 g/mol, perfluorinated analog of pentane, and liquid gas phase transition occurs when the ambient temperature reaches 29° C.

Preferably, in step (2), the cationic ultrasonic phase change nanoparticles are incubated with small molecule nucleic acids at a charge ratio of 3:2.

Preferably, in step (2), small molecule nucleic acid drugs are at least one of siRNA or microRNA, the incubation time of the cationic ultrasonic phase change nanoparticles and small molecule nucleic acid drugs on ice is 30-40 minutes, the particle size of cationic ultrasonic phase change nanoparticles is 300-400 nm.

Preferably, in step (3), the ultrasonic phase change nanoparticle carrying the small molecule nucleic acid drugs and the cell membrane are mixed at a mass ratio of phospholipid and membrane protein of 1:1, the amount of PFP added before acoustic shock is 200 μL, oil phase is added to increase the success rate of the preparation of biomimetic nanoparticles, the ultrasonic vibration is performed with an acoustic cell disruptor at 90 W for a total of 5 minutes and at a duty cycle of 50%, after centrifugation at low temperature and high speed for several times to remove the excess impurities, the centrifugation conditions are set at 12000 rpm for 15 minutes every time, and three centrifugations are carried out.

Its application is also provided which is applied in a targeted therapy for acute myocardial infarction, acute rejection after heart transplantation, lung metastasis of breast cancer and liver metastasis of colon cancer.

The invention will be further described in detail below in combination with the accompanying drawings.

Embodiment 1 Preparation of Biomimetic Nanoparticles of Mesenchymal Stem Cells

The preparation of cationic nanoparticles (CNPs) needs to be performed in the whole process away from light. High precision electronic balance is used to weigh the lipid components DSPC, DSPE, DOTAP, at a mass ratio of 10:4:2. Cationic lipid phase change nanoparticles are synthesized by thin-film hydration and ultrasonic vibration. Dichloromethane is added to a round bottom flask with a 1 ml micro sampling gun, and the round bottom flask is closed with a rubber stopper to prevent the volatilization of dichloromethane. An ultrasonic cleaner is used to assist in the full dissolution of lipid components. A rotary evaporator is preheated to 50° C. until a uniform translucent film structure appears at the bottom of the bottle. After that, the flask is removed and put in an ultrasonic cleaner to shake and mix well, so that the film can completely be eluted to form a homogeneous and translucent suspension, placed on ice for pre cooling, and added 1 ml of ultrasonic phase change material PFP. The ultrasonic cell disruptor is set to 90 W, and the acoustic shock time is 5 minutes in total (on: 5 seconds; off: 5 seconds). A probe is placed below the liquid level without touching the bottom of the bottle. The probe is moved up and down during the shock process to ensure uniform shock. After the acoustic vibration, the translucent suspension becomes an opaque emulsion, which is the initial emulsion of nanoparticles. The nanoparticle emulsion is distributed into two 15 ml centrifuge tubes and centrifuged at 12000 rpm for 15 minutes at a low-temperature high-speed centrifuge. After centrifugation, the ultrapure water is redissolved and the excess impurities are removed three times.

The morphology of nanoparticles is observed by an ordinary light microscope, and the particle size and potential of nanoparticles are detected by Malvern laser particle sizer.

The nanoparticle sample is a milky white suspension. The morphology of CNPs in the liquid is preliminarily observed by a light microscope. It can be seen that CNPs are uniform in size and evenly distributed in spherical shape. The particle size and potential distribution of nanoparticles are detected by a Malvern laser particle size analyzer. The average particle size of CNPs is 300-400 nm and the potential is 30-40 mv.

Embodiment 2 Preparation of microRNA Cationic Nanoparticles

The cationic nanoparticles obtained in embodiment 1 are mixed with microRNA at a charge ratio of 3:2, incubated on ice for 2 hours, and Mir CNPs are obtained by electrostatic adsorption. The unbound miRNA is removed by centrifugation at 12000×g for 3 times.

The particle size and potential of nanoparticles were detected by a Malvern laser particle sizer. FITC is used to label microRNA. The surface FITC fluorescence intensity of the miR-CNPs is detected by a flow cytometry after the miR-CNPs are diluted 10 times with ultrapure water.

The average particle size of miR-CNPs is about 400 nm, and the average potential is about −20 mV. Compared with cationic nanoparticles, the particle size of nanoparticles after carrying micro-RNA increases slightly, and the surface potential changes from positive to negative. The efficiency of micro-RNA carried on the surface of nanoparticles is 92.6% by a flow cytometry analysis.

Embodiment 3 Preparation of Biomimetic Nanoparticles of Mesenchymal Stem Cells The membranes of MSCs and macrophages are extracted with a membrane protein extraction kit of Thermo Fisher Scientific. After cells are scraped from a bottom of a petri dish with a plastic cell scraper, a cell suspension is made. It is centrifuged by a low-temperature high-speed centrifuge at 300×g for 5 minutes at 4° C., and a supernatant is removed after centrifugation. The cells are resuspended after adding cell cleaning solution. The supernatant is removed after repeating centrifugation under the same conditions. A permeabilization buffer is added to the washed cell pellet to resuspend the cells and incubated them on ice for 10 minutes. The permeabilized cells are centrifuged at a low-temperature high-speed centrifuge at 16000×g for 15 minutes at 4° C., and the cell membrane is obtained after removing the supernatant. The cell membrane pellet is resuspended in ultrapure water and stored in a −80° C. refrigerator for future use.

Based on the fluidity of lipid membrane, cell membrane components are added to the lipid shell components of nanoparticles by an acoustic shock method to prepare biomimetic nanoparticles carrying miRNA. 10 mg of nanoparticles carrying microRNA cationic prepared in Embodiment 2 are mixed with MSCs cell membrane and macrophage membrane obtained in the previous step at the ratio of phospholipid to membrane protein mass ratio of 1:0.5:0.5 to prepare biomimetic nanoparticles carrying microRNA and membrane of MSCs and macrophage (miR-MRCNPs). The mixture is placed in an ice bath, to which 200 μ 1 PFP is added again, and the mixture is sonicated for 3 minutes (60 W, on: 5 seconds; Off: 5 seconds). The biomimetic nanoparticles are collected by centrifugation at 15000 rpm for 15 minutes. The morphology, size distribution and zeta potential of biomimetic nanoparticles are determined.

Malvern laser particle size analyzer shows that compared with miR-CNPs, the average particle size and the absolute value of potential of biomimetic nanoparticles increase, with an average particle size of 500-600 nm and an average potential of −40 mV. A transmission electron microscope shows that the internal structures of the three nanoparticles are typical core-shell structures.

Evaluation of Ultrasonic Phase Transformation Ability of miR-MRCNPs

The biomimetic nanoparticles are added into agarose gel holes, and a LIFU probe coated a coupling agent is placed on a side wall of the gel holes. The irradiation parameter intensity is set as 2 W/cm$^2$, 1.5 cm of a focal length, 50% of a duty cycle, and a pulse wave mode. The result shows that with the extension of the irradiation time, the acoustic intensity of the nanoparticles gradually enhanced, reaching the maximum in 4 minutes.

Verification of Cell Membrane Fusion and Detection of Cell Membrane Nanoparticle Colocalization The membrane of MSCs and macrophages are labeled with DiO and DiR lipid labeled probes, respectively. The morphology and surface fluorescence labeling of biomimetic nanoparticles are observed under a fluorescence microscope. The mixed cell membrane biomimetic nanoparticles are incubated with mouse endothelial cells for 2 hours, the nuclei are counterstained with DAPI, and the fluorescence colocalization is observed under a laser confocal microscope. The result shows that green fluorescence of the cell membrane and red fluorescence of the lipid components of the nanoparticles can be simultaneously detected on the biomimetic nanoparticles surrounding the nucleus, which proves that the cell membrane and nanoparticles have better fusion efficiency. The expression of specific proteins is detected by a Coomassie brilliant blue method, and protein CD49, CD47, and CD29 on the surface of MSCs and RAW 264.7 is detected by a protein imprinting method. The result shows that protein CD49, CD47, and CD29 are expressed on the surface of biomimetic nanoparticle cell membrane.

Detection of a Macrophage Phagocytic Escape Ability of miR-MRCNPs In Vitro

Four kinds of nanoparticles, CNPs, miR-CNPs, miR-MCNPs and miR-MRCNPs, are labeled with a DIO lipophilic dye. Macrophages are seeded in a plate with 24 wells, and 200μ 1 of nanoparticles are added to each well and incubated for 1 hour. The uptake efficiency of CNPs by macrophages is relatively higher than that of other nanoparticles. The escape ability of biomimetic nanoparticles modified with macrophage membrane for macrophages is higher than that of simple MSCs biomimetic nanoparticles. The result confirms that the improvement of the biological interface is helpful to enhance the escape ability of nanoparticle phagocytosis system.

Detection of an Adhesion Ability of miR-MRCNPs to Inflammatory Endothelial Cells and Cardiomyocytes In Vitro Vascular endothelial/cardiomyocytes are seeded in a plate with 24 wells. Each well is added with 50 ng/ml of an inflammatory factor TNF-α, and incubated at a constant temperature for 24 hours to activate endothelial/cardiomyocytes. Four kinds of nanoparticles including 100 μg of CNPs, miR-CNPs, miR-MCNPs and miR-MRCNPs are added. Incubate for 1 hour. A large number of CNPs are adhered to the surface of inflammatory activated cells, and the adhesion rate of biomimetic nanoparticles is relatively low. There is no significant difference between miR-MCNPs and miR-MRCNPs.

Detection of a Transfection Ability of miR-MRCNPs Combined with UTMD In Vitro and Detection of an Apoptosis Ability of Anti-Myocardial and Endothelial Cell Endothelial cells and cardiomyocytes stimulated and cultured by TNF-α are seeded in a plate with 24 wells. LIFU irradiation conditions are set to 1.03 MHz, duty cycle 50%, 2 W/cm$^2$, 10 minutes of irradiation time. The fluorescence distribution of miRNA in cells is observed by a fluorescence microscope 24 hours after transfection. The result shows that the green fluorescence signal of microRNA overlaps with the red fluorescence range representing the cytoskeleton, which proves that miR-MRCNPs combined with UTMD are successfully transfected in cardiomyocytes and endothelial cells.

Embodiment 4 Efficacy and Safety In Vivo
Evaluation of miR-MRCNPs Biomimetic
Ultrasound Phase Change Nanoparticles C57BL/6 mice, male, 6-8 weeks old, are selected to establish the mouse model of acute myocardial infarction by ligation of the left anterior descending artery with LDA. 0.2 ml of biomimetic phase-change nanoparticles carrying microRNA are intravenously injected and the low-frequency ultrasound probe is applied with couplant to irradiate a precordial region. The irradiation parameters are set to duty cycle 50%, 2 W/cm$^2$, 1.5 m of a focus, pulse wave mode, 10 minutes of irradiation time. The mice are treated according to groups on the 1st, 3rd, 5th and 7th day after myocardial infarction. After treatment, the myocardial infarction area of mice is significantly reduced, the cardiac function of the mice is significantly improved by echocardiography, the fibrotic area of Masson staining is significantly reduced, and the vascular endothelial density in the perimyocardial area is increased by an immunofluorescence staining.

The detection result of the weight of the mice every other week shows that the weight of the mice in each group increases steadily, and there is no obvious difference in the organ to weight ratio of liver, kidney, spleen and lung. The main organs of the mice are sectioned and pathologically examined. The result shows that the texture of the main organs in each group is uniform, and no edema and parenchymal lesions are observed.

The mice in each group are randomly divided into four groups (n=30) according to the different tail vein injection of nanoparticles, which are ① CNPs group; ② miR-CNPs group; ③ miR-MCPNs group and 4 miR-MRCNPs. The blood of the mice in each group is collected from the inner canthal vein of the mice at 5 minutes and 1, 2, 4, 6, 8, 12, 24 and 48 hours after nanoparticle injection, and the supernatant is taken after centrifugation at 12500 rpm for 15 minutes. The absorbance at 635/680 nm is detected, and the result shows that the circulation time of nanoparticles in vivo is significantly prolonged.

DiO lipid fluorescence probes are used to label the phospholipid components in CNPs, miR-CNPs, miR-MCPNs and miR-MRCNPs nanoparticles. After 3 days of infarction, each mouse is injected with 200 μl of nanoparticles by a tail vein. 1, 8 and 24 hours after injection, the mice in each group are anesthetized and subjected to cardiac perfusion. The lung, liver, spleen and kidney are removed. The distribution of nanoparticles is detected by in vivo fluorescence imaging system. The results shows that the fluorescence of nanoparticles in the miR-CNPs, miR-MCPNs and miR-MRCNPs group is stronger in the lung at the initial stage after injection, and then in the liver and kidney. The fluorescence of nanoparticles gradually increased, and at the 24th hour, In the miR-CNPs group, the fluorescence signal cannot be detected in all organs. In the biomimetic nanoparticles group, miR-MCPNs and miR-MRCNPs still have strong fluorescence signal in the liver after 24 hours, but miR-MRCNPs group is stronger than miR-MCPNs group, which proves that the nanoparticles have longer time in vivo and better stability than non-biomimetic nanoparticles.

The mice in each group are injected with nanoparticles, and the mice are sacrificed 10, 30, and 60 minutes after injection. The right atrial appendage of the mice is cut off, and normal saline is injected into the myocardium through the apex of the mouse heart. The mice are perfused circularly, and the free nanoparticles in the myocardial microcirculation are washed away. The hearts are taken and placed in a small animal live imaging instrument to detect the fluorescence distribution and intensity in the heart. DiO and DiR dyes are used to label the cell membrane and nanoparticle core on the surface of miR-MRCNPs, respectively. The colocalization of the two kinds of fluorescence in the myocardium is detected by a small animal in vivo imaging device. Fluorescence aggregation can be seen in the hearts of mice in miR-MCPNs group and miR-MRCNPs group 10 minutes after injection, and the fluorescence intensity gradually increases with time.

After injecting the miR-MRCNPs labeled with DiO and DiR in the previous step into a mouse AMI model through the tail vein, the mice are sacrificed and perfused with heart tissue, embedded with an OCT embedding agent, and the obtained myocardial tissue is made into 8 μm thick sections with a cryomicrotome. DAPI nuclear dye is used to label the nucleus. Under the fluorescence microscope, the green and red fluorescence representing biomimetic nanoparticles in the myocardium around the infarction area shows a short line like distribution, and the two fluorescence ranges coincided.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A preparation method for an ultrasound responsive lipid nanoparticle carrying genes and a cell membrane, wherein a surface of the ultrasound responsive lipid nanoparticle carrying the genes and the cell membrane is connected with small molecule nucleic acids based on a principle of charge adsorption, a component of the cell membrane is mixed in a surface lipid layer, perfluoropentane (PFP) is encapsulated inside the ultrasound responsive lipid nanoparticle carrying the genes and the cell membrane, liquid gas phase transition occurs under ultrasonic irradiation, and blasting occurs under continuous ultrasonic irradiation, a blasting energy generated forms reversible acoustic holes on a surface of the cell membrane, and a drug released after blasting is driven by a blasting driving force to directly enter an interior of a cell through the reversible acoustic holes, realizing an efficient release and transfection of nucleic acids in the cell; and the preparation method comprises:

(1) preparing a cationic ultrasonic phase change nanoparticle: mixing DSPC, DSPE, and DOTAP, and dissolving in dichloromethane, placing in a rotary evaporator to obtain a layer of uniform translucent film, adding ultrapure water, placing in an ultrasonic cleaner to completely elute the film to form a homogeneous and translucent suspension, transferring the suspension to a centrifuge tube, precooling on ice, adding an ultrasonic phase change material, changing the translucent suspension obtained into an opaque lotion after ultrasonic vibration to obtain an initial lotion with nanoparticles, centrifugating to remove excess impurities, to obtain the cationic ultrasonic phase change nanoparticle purified;

(2) preparing an ultrasonic phase change nanoparticle carrying a small molecule nucleic acid drug: mixing the cationic ultrasonic phase change nanoparticle prepared in the step (1) with the small molecule nucleic acids and incubating on ice, connecting the small molecule nucleic acids to a surface of lipid nanoparticles based on the principle of the charge adsorption, and forming charge reversal on the surface of the lipid nanoparticles to prepare the ultrasonic phase change nanoparticle carrying the small molecule nucleic acid drug;

(3) preparing a biomimetic ultrasound phase change nanoparticle carrying the small molecule nucleic acid drug: mixing the cell membrane with the ultrasonic phase change nanoparticle carrying the small molecule nucleic acid drug obtained in the step (2), adding a cell membrane component to a lipid shell component of the nanoparticle based on a fluidity of a lipid membrane by an acoustic vibration method, placing a mixture in an ice bath, adding the PFP to the mixture again, obtaining the biomimetic ultrasound phase change nanoparticle carrying the small molecule nucleic acid drug after ultrasonic vibration, and centrifuging to remove excess impurities, to obtain the biomimetic ultrasound phase change nanoparticle carrying the small molecule nucleic acid drug purified;

wherein in the step (1), a mass ratio of the DSPC, the DSPE, and the DOTAP is 10:4:2;

wherein in the step (1), the ultrasonic vibration uses an acoustic cell disruptor with a condition set to 90 W, a total time of 5 min, and a duty cycle of 50%; a condition of the rotary evaporator is set at 60° C. for 1 h; a purification is repeated by a low-temperature high-speed centrifuge, and a centrifugation condition is set at 12000 rpm at 4° C. for 15 min each time, a total of three times;

wherein in the step (1), the phase change material is liquid perfluoropentane referred to as the PFP, chemical formula $C_5F_{12}$, molecular weight 288.036 g/mol, perfluorinated analog of pentane, and the liquid gas phase transition occurs when ambient temperature reaches 29° C.;

wherein in the step (2), the cationic ultrasonic phase change nanoparticle is incubated with the small molecule nucleic acids at a charge ratio of 3:2;

wherein in the step (3), a centrifugation condition is set at 12000 rpm at 4° C. for 15 min every time, and three centrifugations are carried out.

2. The preparation method for the ultrasound responsive lipid nanoparticle carrying the genes and the cell membrane according to claim 1, wherein in the step (2), the small molecule nucleic acid drug is at least one of siRNA or microRNA, an incubation time of the cationic ultrasonic phase change nanoparticle and the small molecule nucleic acid drug on ice is 30-40 min, a particle size of the cationic ultrasonic phase change nanoparticle is 300-400 nm.

3. The preparation method for the ultrasound responsive lipid nanoparticle carrying the genes and the cell membrane according to claim 2, wherein in the step (3), the ultrasonic phase change nanoparticle carrying the small molecule nucleic acid drug and the cell membrane are mixed at a mass ratio of phospholipid and membrane protein of 1:1, an amount of the PFP added before an acoustic shock is 200 μL, an oil phase is added to increase a success rate of a preparation of biomimetic nanoparticles, and the ultrasonic vibration is performed with the acoustic cell disruptor at 90 W for the total of 5 min and at the duty cycle of 50%.

* * * * *